United States Patent [19]
Gravel et al.

[11] Patent Number: 6,148,681
[45] Date of Patent: Nov. 21, 2000

[54] LEVEL PROBE WITH MODULAR CONNECTION

[75] Inventors: James L. Gravel, Prior Lake; Bruce L. Johnson, St. Anthony, both of Minn.; James A. Kronmiller, River Falls, Wis.; Randall C. Olson, Prior Lake; Steven D. Kruse, Bloomington, both of Minn.

[73] Assignee: Rosemount Inc., Eden Prairie, Minn.

[21] Appl. No.: 09/322,727

[22] Filed: May 28, 1999

Related U.S. Application Data

[63] Continuation-in-part of application No. 08/779,321, Jan. 6, 1997, Pat. No. 5,955,684.

[51] Int. Cl.⁷ .................................................. G01F 23/26
[52] U.S. Cl. ............................................................ 73/866.5
[58] Field of Search ............................ 73/866.5, 304 C, 73/304 R, 290 V, 756; 374/208; 324/690, 696

[56] References Cited

U.S. PATENT DOCUMENTS

| | | | |
|---|---|---|---|
| 3,119,267 | 1/1964 | Bartky et al. ............................... | 73/304 |
| 4,198,110 | 4/1980 | Wetmore et al. ...................... | 339/89 R |
| 4,449,405 | 5/1984 | Franz et al. ............................ | 73/304 C |
| 4,454,370 | 6/1984 | Voznick ................................... | 136/221 |
| 4,499,640 | 2/1985 | Brenton et al. ......................... | 29/25.41 |
| 4,551,785 | 11/1985 | Kroner ..................................... | 361/284 |
| 4,574,328 | 3/1986 | Maier ....................................... | 361/284 |
| 4,628,392 | 12/1986 | Didier ......................................... | 361/2 |
| 4,926,695 | 5/1990 | Kleven et al. ......................... | 73/861.24 |
| 5,410,104 | 4/1995 | Gretz et al. ........................... | 174/65 SS |
| 5,440,455 | 8/1995 | Rottmar .................................... | 361/809 |
| 5,661,251 | 8/1997 | Cummings et al. .................... | 73/866.5 |
| 5,827,985 | 10/1998 | Grieger et al. ......................... | 73/866.5 |

FOREIGN PATENT DOCUMENTS

3337481 A1  4/1985  Germany .
2 045 433  10/1980  United Kingdom .

OTHER PUBLICATIONS

"Is Your Equipment Designed and Installed Safely?", *InTech*, pp. 40–43, (Jun. 1996).
National Electrical Code, Sections 500–503, (1996).
European Standard prEN 50284, pp. 1–16, (dated Apr. 1997).
"Approval Standard for Explosionproof Electrical Equipment General Requirements", *Factory Mutual Research*, pp. 1–34, (Jan. 1, 1992).
"Level Measurement Solutions", Fisher–Rosemount, *Managing the Process Better*, 15 pages, (1995).

*Primary Examiner*—Robert Raevis
*Attorney, Agent, or Firm*—Westman, Champlin & Kelly, PA

[57] ABSTRACT

A process seal assembly adapted for installation to a process vessel opening. A probe with a probe connector connects to a rod inside a passageway of a housing adapted to be sealingly mounted to the process vessel opening. The rod has a first end coupled to the probe connector and a second end adapted to couple with a transmitter connector body. A rigid, electrically insulating spool is fastened in the passageway, with an outer spool surface fitting tightly to a wall of the passageway and an axial hole fitting tightly to the rod.

30 Claims, 5 Drawing Sheets

LEVEL PROBE WITH MODULAR CONNECTION

CROSS-REFERENCE TO RELATED APPLICATION

This application is a continuation-in-part of a U.S. patent application titled MODULAR PROBE, Serial No. 08/779,321 filed Jan. 6, 1997, now U.S. Pat. No. 5,955,684.

BACKGROUND OF THE INVENTION

The present invention relates to a probe that senses a level in a process vessel and provides an output indicating the level.

Explosion proof transmitter housings and explosion proof enclosures for other process control equipment are known, but only having explosion proof housings does not complete the explosion proof installation when a probe forms part of the assembly. Both the housing or enclosure and the probe assembly itself must be approved for use in hazardous location installations. Direct mounted probes, that is, probes mounted directly to a housing, require a seal between the probe and the interior of the housing that is adequate to comply with the design requirements. In order to comply with the National Electric Code, an explosion proof barrier has to be located adjacent the housing or such a barrier has to be provided for the probe.

Various attempts have been made to provide seals that will meet the necessary requirements for explosion proof probes under the National Electric Code (NEC) and corresponding codes in other areas, but these are difficult to service and handle and generally cannot be sold as "factory sealed", which is a great benefit in installation.

SUMMARY OF THE INVENTION

The present invention relates to a modular design of a probe assembly including a probe and process seal assembly which mount to a transmitter assembly and to an opening on a process vessel such as a tank. The probe is used for sensing a parameter, such as the level of a liquid or dry bulk material in the process vessel. Usually, the probe assembly and transmitter housing assembly of the present invention are used in an industrial process where the level of some component in the process has to be monitored. The probe may be a capacitance probe, a micro impulse radar probe, or another type of sensor probe. In the present invention, a probe assembly includes a rigid, electrically insulating spool fastened with tight fits to a passageway of a process seal housing and to a rod which connect to a connector on the probe. The rigid, electrically insulating spool provides a self contained process seal. The probe assembly may be installed in a location such as the tank wall, prior to transmitter installation. The transmitter, with its explosion proof barrier connector, is joined to the probe assembly by threading or by other suitable connections known by people skilled in the art of connecting assemblies.

The probe assembly can be left in place in the tank, and the transmitter assembly may be removed or replaced from the probe assembly without disassembly of the transmitter housing. The probe can remain installed and undisturbed while the transmitter is replaced.

The transmitter assembly thus can be separated from the probe and checked with independent measuring devices without exposing sensitive electronics to the environment of the installation or removing the probe from its installation.

The probe can also be serviced while installed. This can be done by removing the transmitter assembly from the probe assembly, removing the probe assembly from the tank opening, and then servicing the probe from the exterior of the tank.

The probe can be fabricated separately from the process seal assembly, and separately from the transmitter housing, allowing for modular manufacturing of the probe, transmitter and process seal assembly. A factory sealed assembly designation can be used with the transmitter assembly and process seal assembly, which then can be sold as separate units.

Various types of probes can be used. In particular, a micro impulse radar probe and a capacitive probe are shown herein. Other types of probes for different applications can be used as desired.

The components are easily manufactured, and provide an intrinsically safe system with an explosion proof coupling for use between a probe and a companion transmitter circuit housing.

DETAILED DESCRIPTION OF THE PREFERRED EMBODIMENTS

Figure 1:
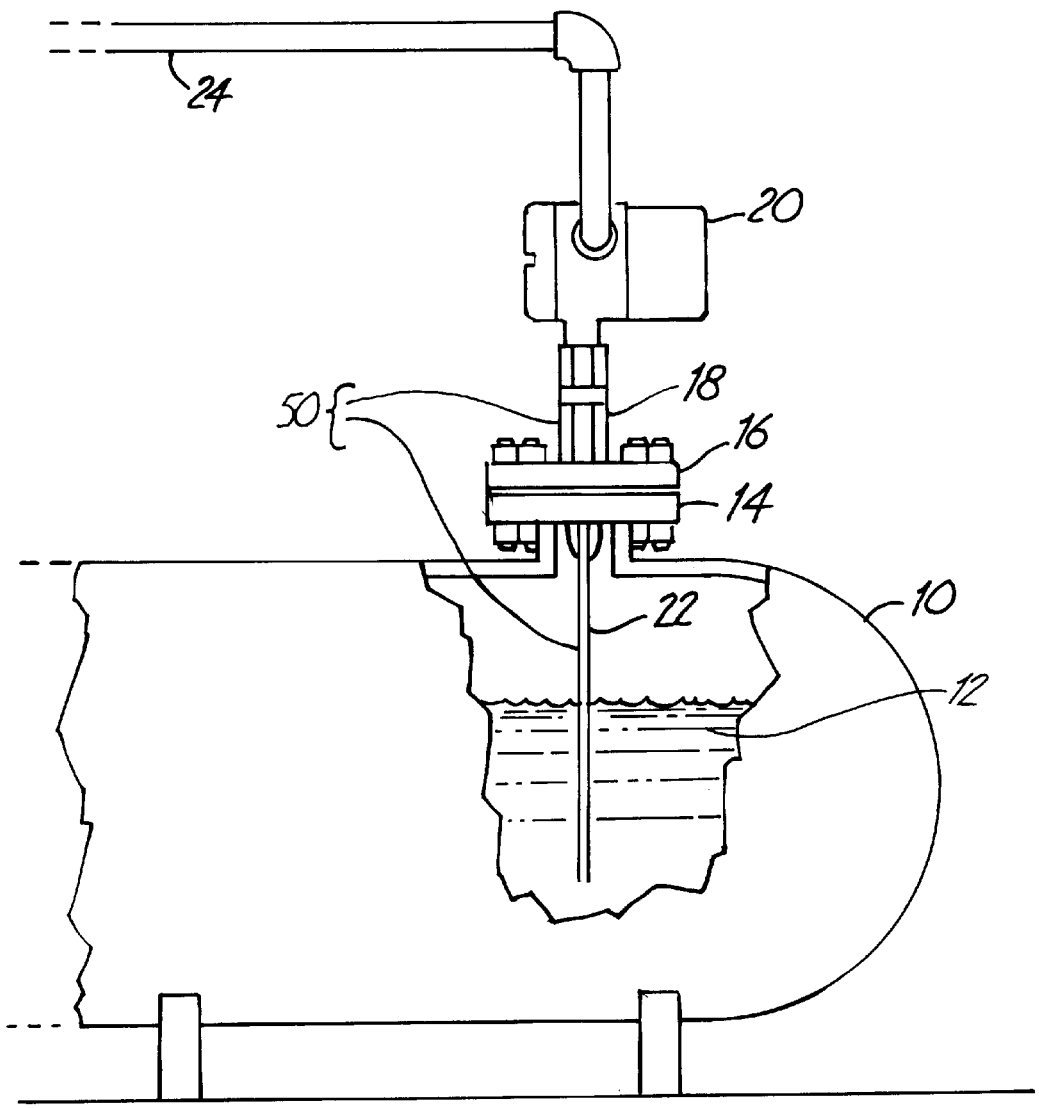
FIG. 1 is a schematic representation of a typical probe installation utilizing a process seal assembly of the present invention.

In FIG. 1 a process vessel 10 used in a process control environment, contains a liquid 12, the level of which is to be sensed or measured. A tank port has a welded flange 14 on which a flange 16, which can have a threaded throughhole, is bolted. A process seal assembly made according to the present invention indicated generally at 18 is either threaded into flange 16 or integral with it. The process seal assembly 18 is connected to a transmitter assembly 20 which is a standard transmitter assembly including a circuit that receives signals from a probe (or antenna or transmission line) 22. Transmitter assembly 20 conditions signals from probe 22 and generates an output indicating level of the liquid 12. The output can be displayed locally or transmitted to a remote location. Electrical conduit 24 connects to transmitter assembly 20 and provides an electrical raceway for wires bringing power to the transmitter and/or wires going to a remote location for monitor or display of the transmitter output. Process seal assembly 18 and probe 22 comprise a probe assembly 50.

Figure 2:
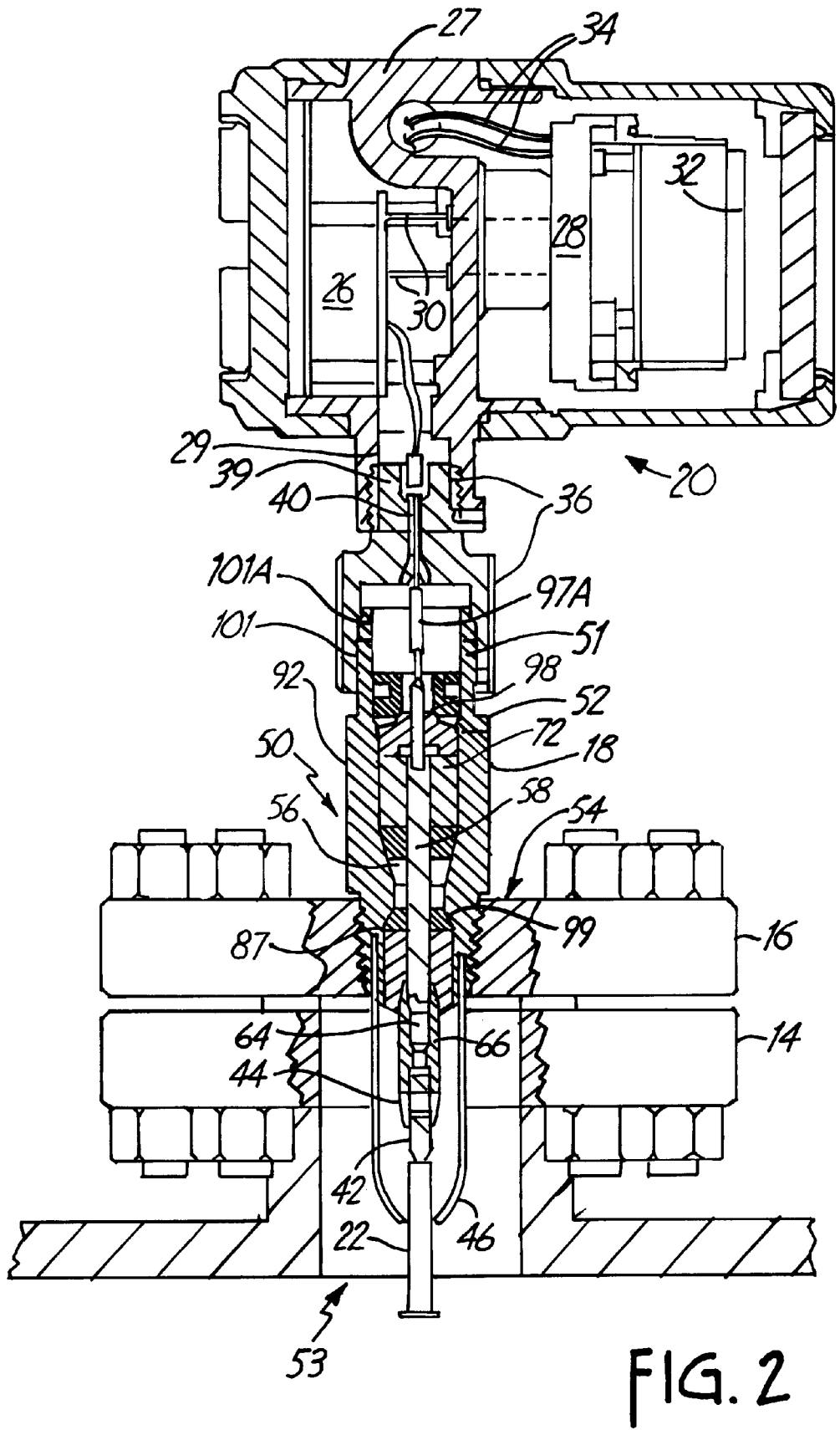
FIG. 2 is a schematic sectional view of a transmitter assembly, process seal assembly and probe assembled to a process vessel opening.

In FIG. 2, the transmitter assembly, process seal assembly and probe of FIG. 1 are shown in more detail using the same reference numerals used in FIG. 1. Transmitter assembly 20 includes a sensor circuit 26 which energizes the probe 22 and receives signals from the probe 22 indicative of the level of liquid 12. Sensor circuit 26 communicates with output circuit 28 via sealed electrical feedthroughs 30 in a wall in the transmitter. Output circuit 28 generates an output indicative of level which can be coupled to a local display 32, which can be a liquid crystal display or other known display, coupled via leads 34 to a remote location via electrical conduit 24, or both. Transmitter assembly 20 also includes and removably mounts on an explosion proof coupler 36 which makes a sealed, explosion proof feedthrough of electrical signals along conductor 40 from sensor circuit 26 to process seal assembly 18. The transmitter assembly has a housing 27 with a neck 29 that threads onto a neck 39 of coupler 36.

Figure 5:
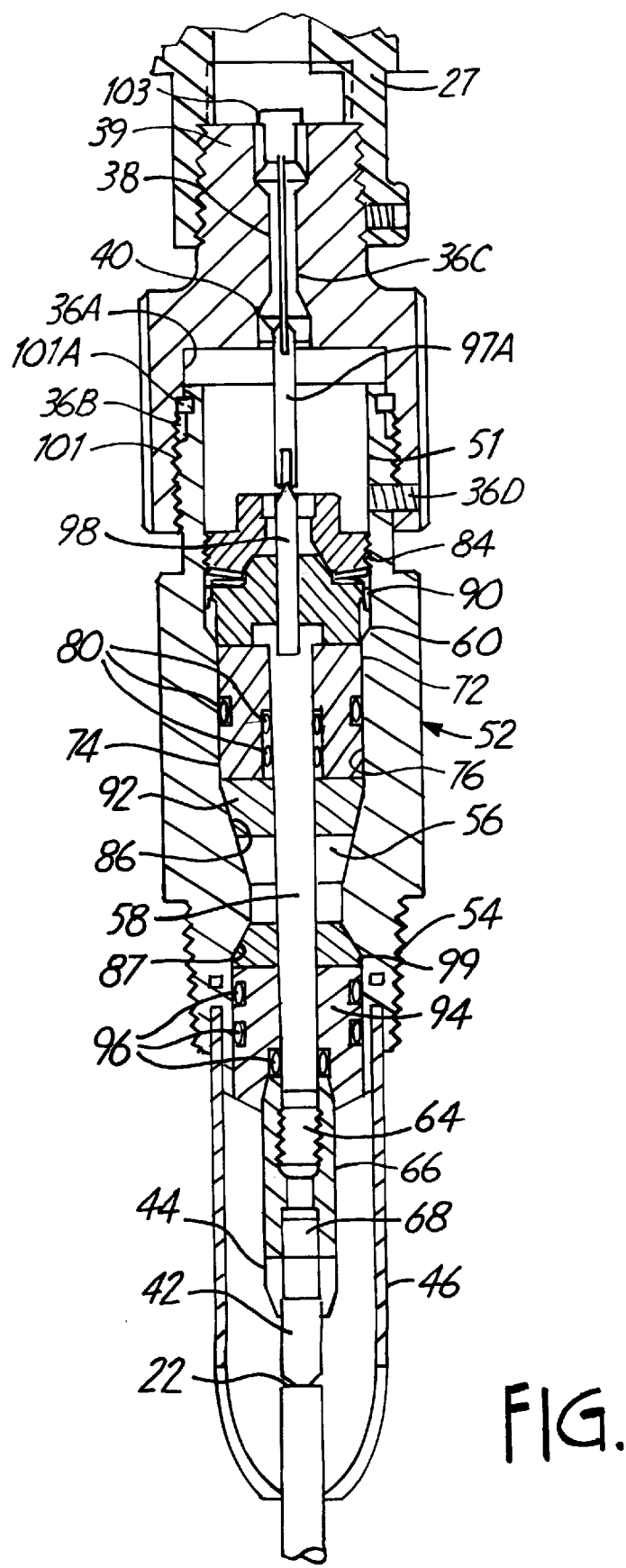
FIG. 5 is a view similar to FIG. 3 with portions of the transmitter assembly in place.

Explosion proof coupler 36 is described in more detail in the above cited parent application which is incorporated by reference. The coupler 36 or connector body has an interior chamber 36A that is threaded as at 36B to receive external threads 101 on a neck 51 the process seal housing 52 to make the assembly shown in FIG. 5. An environmental seal O-ring 101A is provided above the threads 101 and seals on the inner surface of the chamber 36A. The O-ring 101A environmentally seals chamber 36A and surrounds a central passageway 36C in a threaded neck 39 of the coupler 36. The seal O-ring 101A will provide an adequate environmental seal by threading the threads 36B and 101 together from hand tight to 1½ loosening revolutions. This provides protection for the connector interface to the probe from the outside environment as will be explained. The environmental seal and joint formed between the chambers 36A and O-ring 101A also acts as a vent system for the factory seal designation. This connection can be locked in place with a suitable set screw 36D passing through the wall of the coupler 36. The threaded opening and set screw 36D, the threads 101 on neck 51 of process seal housing 52, and a slot 37 cut in threads 101 on neck 51 form a vent to atmosphere.

The explosion proof seal is formed with a potting material filling 38 in bore 36C in the neck portion 39 of the coupler 36 body. As shown, the bore or central passageway 36C is filled with a potting material 38 that has a sufficient length along the axis of passageway 36C to meet explosion proof requirements. The potting material also mounts a connector pin 40 in place. Material 38 forms a potted joint which is not changed during servicing or use.

The explosion proof joint is manufactured to conform to all of the requirements of the explosion proof rating. Central passageway 36C and, if desired, the pin 40 are both irregularly shaped in cross section to reduce the likelihood of blowing out the pin or potting material. The central passageway 36C has flared counter bore sections at either end, as shown. The connector pin 40 is of size and length to form an electrical connection to the probe as will be explained.

In FIG. 2, process seal assembly 18 mounts on process vessel opening 53 and couples electrical signals between the sensor circuit 26 and probe 22. Probe 22 has a probe connector 42 welded on to it. Connector 42 is threaded into the end of process seal assembly 18 and held in place with a locknut 44. The connection is enclosed in an electrical creepage shield 46, which allows a 1.0 npt connection to the process vessel 10.

The probe 22 as shown in FIGS. 1 and 2 is a capacitance probe, in the first form of the invention. The probe 22 forms one plate of a capacitance sensor. The second capacitive plate can be the tank wall or a reference probe. When the probe is covered with a suitable electrical insulator and used with electrically conductive liquids, the liquid serves as a second capacitor plate.

Other types of probes or transmission lines can be used such as a micro impulse radar probe or antenna, utilizing the same arrangement shown in FIGS. 1 and 2. The radar signal encounters a discontinuity at the liquid surface, which generates a reflected radar pulse which returns to the transmitter. A Teflon sheath may be used to make the probe immune to corrosive materials. The probe or transmission line may take various forms, for example, twin lead rigid, twin lead cable, or coaxial. Also the electrical creepage shield can be eliminated in some embodiments, and one leg of the twin lead attached to a flange or npt connection.

Figure 3:
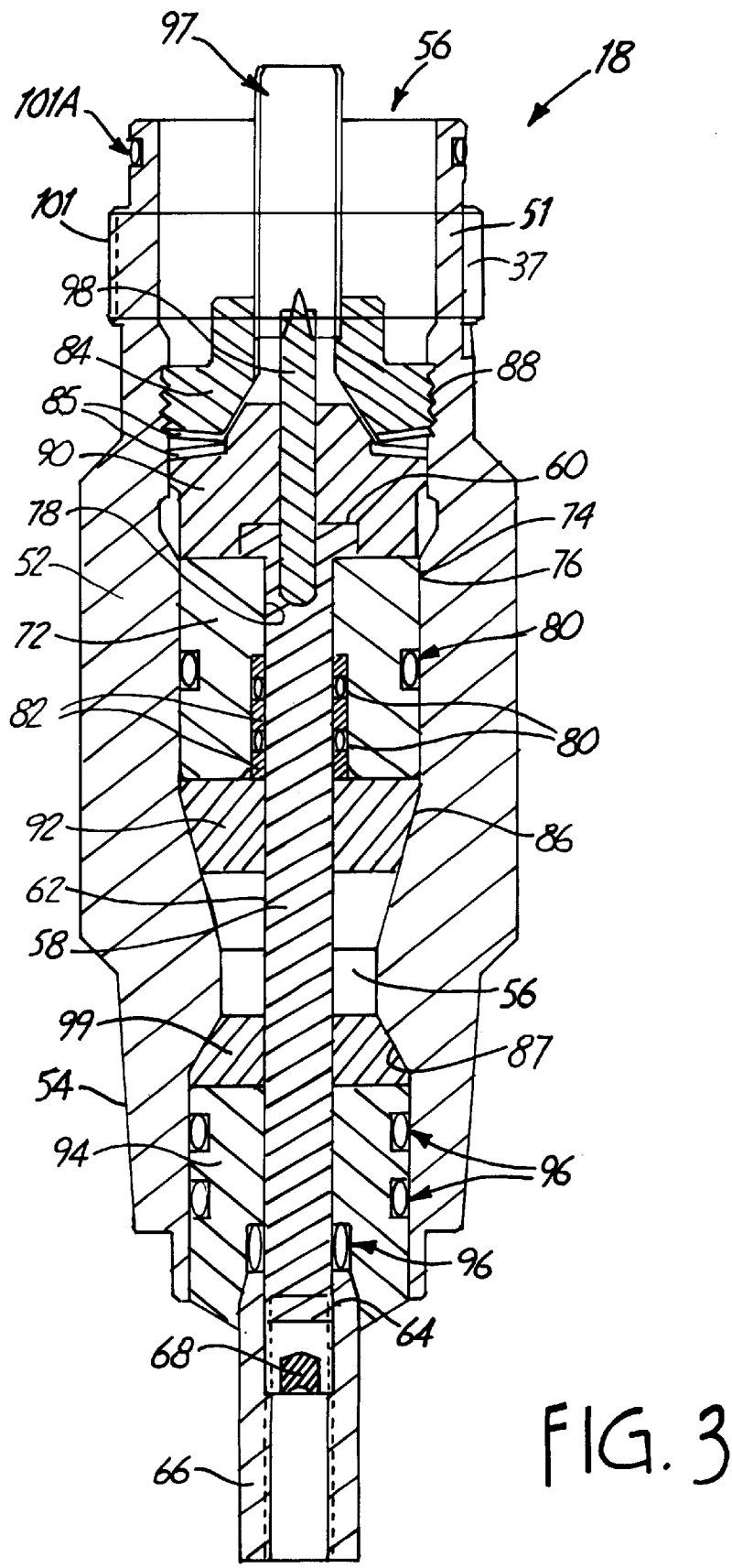
FIG. 3 is a sectional view of an assembled process seal assembly of the present invention.
Figure 4:
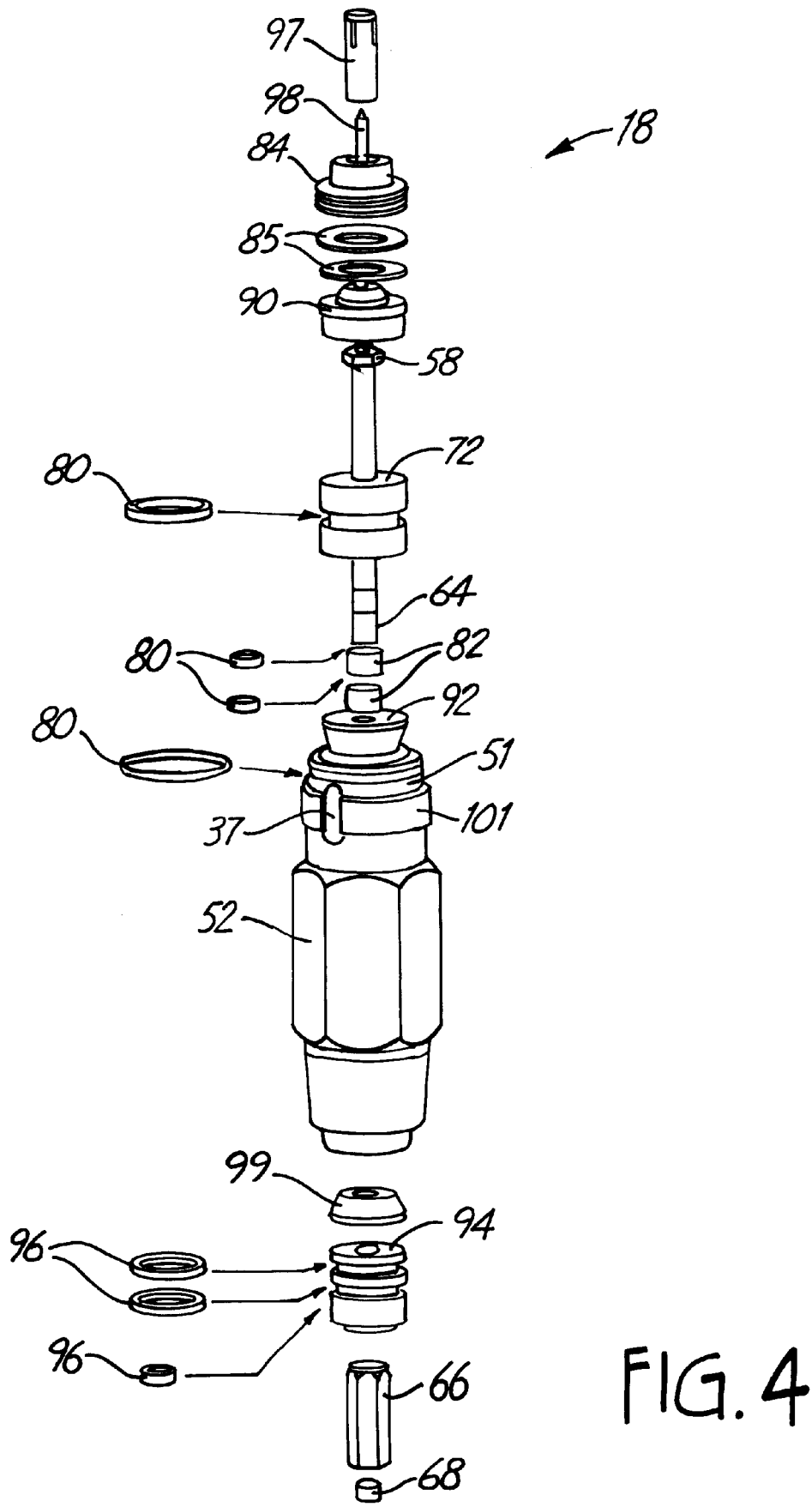
FIG. 4 is an exploded view of a process seal of the present invention.

In FIGS. 3 and 4, process seal assembly 18 according to the present invention is shown. FIG. 3 is an assembled cross sectional view of the process seal assembly 18, and FIG. 4 is an exploded view of the process seal assembly 18. The reference numerals used in FIGS. 1 and 2 are also used in FIGS. 3 and 4 to identify similar or identical parts.

In FIGS. 3 and 4, the process seal assembly 18 is shown which, together with probe 22, comprises the probe assembly 50. Probe assembly 50 is adapted for installation to a process vessel opening 53. The process seal assembly 18 can be a separate part which threads into flange 16 or flange 16 can be integral with the process seal assembly 18. Probe 22 can be welded to probe connector 42 or attached by other means as desired. Process seal housing 52 can be formed of stainless steel or other suitable material and is adapted with threads at 54 for sealingly mounting to the process vessel opening. Process seal housing 52 has a passageway 56 which extends from inside to outside the process vessel 10. A conductor rod 58 is conveniently formed from hexagonal stock with a hexagonal head 60 and a round shank 62. Rod 58 extends through the passageway 56 and has a first end 64 which couples to the probe connector 42 (FIG. 2) via an extender nut 66 which is locked in place by setscrew 68. A second end at hexagonal head 60 is adapted to couple with explosion proof coupler 36 (FIGS. 2 and 5) which serves as a transmitter connector body. A rigid, spool-shaped insulator 72 is fastened in the passageway 56, with an outer spool surface 74 slip fitting to a wall 76 of the passageway 56 and an axial hole 78 slip fitting to the rod 58. Resilient seals 80 are disposed between the spool 72 and the passageway wall 76, and between the spool 72 and the rod 58. A threaded locking ring 84 is provided, at a threaded region 88 of an upper end of passageway 56 to lock in the components. The passageway 56 has an inwardly tapered, narrowing region 86 below spool 72. The spool 72 is fastened in the process seal housing 52 between the narrowing region 86 and the locking ring 84, which is threaded into the threaded region 88 and compresses spring washers 85 to bear against slip ring or isolator ring 90. The spool 72 is isolated from the locking ring 84 by a slip ring or isolator ring 90 of deformable material. The spool 72 is isolated from the narrowed region 86 by an isolator shield 92 of deformable material such as polyphenylene sulfide, available from the Ticona Company, of Wilmington, N.C. under the trade name Fortron®. The deformable material helps to avoid undesired mechanical stress concentration on spool 72 which is preferably ceramic, which is brittle. The locking ring 84 engages spring washers 85 which also fasten the rod 58 in place. The probe connector 42 can be disconnected from the rod 58 without disturbing the fit of the spool 72 or the resilient seals 80, which can be O-rings. A tight fit between the spool outer surface 74 and the passageway wall 76 and between the axial spool hole and the rod 58 can be made long enough and narrow enough to provide flame quenching for additional explosion proofing, if desired.

A seal and guide 94 is disposed in the passageway 56 and has a hole therethrough for guiding the rod 58. The guide 94 is fitted with resilient seals 96 around the rod and the passageway. If desired, a deformable motion guide 99 can be provided to back up the guide 94. The guide 99 is seated on a downwardly expanding surface 87 of the bore 56.

The second end 60 of the rod 58 can comprise a spring loaded pin 98 adapted to contact a corresponding pin 97A that connects to conductor 40. Spring loaded pin 98 can be a commercially available pin of the type used in "bed of nails" test fixtures for printed circuit boards and sometimes referred to as "pogo pins." Spring loaded pin 98 has an outer metal shell surrounding a helical spring which actuates a shaft with a shaft end shaped to provide electrical contact. The spring loaded pin 98 has a tapered self-aligning surface mateable with a corresponding tapered surface on the pin 97A. If desired, a coaxial tube 97 forming a shield can be provided around the spring loaded pin 98. The stroke, or length of travel, of spring loaded pin 98 is selected to be greater than the thread pitch of threads 101 which engage a sealed electrical feedthrough 27 of transmitter assembly 20. This allows transmitter assembly 20 to be fully threaded on threads 101 and then backed off or rotated in the opposite direction through at least a full circle up to 540 degrees. The spring loaded pin 98 extends as the transmitter assembly is rotated to maintain electrical contact. Through this rotation, the display 32 or the opening for electrical conduit 24 can be aligned as desired with the installation environment. The range of travel of spring loaded pin 98 can be further selected to break contact before the threads 101 disengage during removal of transmitter assembly 20 from the probe assembly 18. This reduces the chance of damaging the spring loaded pin 98.

Normally the probe assembly 18 will be shipped separately from the transmitter.

The term probe as used herein means an elongated sensor element having a portion held in a support body with a portion of the element protruding from the support body, whether the sensor element functions as an wave guide or some other probe-like ember. A flat plate sensor inside a container, pipe, in or tank can be supported by the seal body.

The explosion proof coupler 36 can be unthreaded from the transmitter if desired by disconnecting a connector 103 from the upper end of the passageway in the coupler 36. The wires have to have sufficient length otherwise rotatably formed to permit threading and unthreading the coupler 36. It should also be noted that the rod 58 is effectively a part of the probe, or connections to the probe. The plans 98 and 97A, conductor 40 and connector 103 complete the connection to the circuitry in the transmitter assembly.

Although the present invention has been described with reference to preferred embodiments, workers skilled in the art will recognize that changes may be made in form and detail without departing from the spirit and scope of the invention.

What is claimed is:

1. A probe assembly adapted for installation to a process vessel opening, comprising:
   a probe having a probe connector;
   a housing adapted for sealingly mounting to the process vessel opening and releasably mounting to a transmitter housing, the housing having a passageway from inside to outside the process vessel;
   a rod through the passageway having a first end coupled to the probe connector and a second end adapted to couple with a transmitter connector body;
   an electrically insulating spool fastened in the passageway, with an outer spool surface fitting to a wall of the passageway and an axial hole fitting to the rod.

2. The probe assembly of claim 1 wherein the spool tightly fits against the wall of the passageway and the probe connector can be disconnected from the rod without disturbing the fit of the spool.

3. The probe assembly of claim 1 further comprising resilient seals disposed between the spool and the passageway wall, and between the spool and the rod.

4. The probe assembly of claim 3 wherein the probe connector can be disconnected from the rod without disturbing the resilient seals.

5. The probe assembly of claim 1 further comprising a locking ring in the passageway, and wherein the passageway wall has a narrowed region and a threaded region, and the spool is fastened in the housing between the narrowed region and the locking ring threaded into the threaded region.

6. The probe assembly of claim 5 wherein the spool is isolated from the locking ring by a slip ring of deformable material.

7. The probe assembly of claim 6 and further comprising at lease one spring washer compressed between the locking ring and the slip ring.

8. The probe assembly of claim 5 wherein the spool is isolated from the narrowed region by an isolator shield of deformable material.

9. The probe assembly of claim 5 wherein the locking ring also secures the rod in the spool.

10. The probe assembly of claim 1 wherein the spool is ceramic.

11. The probe assembly of claim 1 wherein the fit between the spool outer surface and the passageway wall and between the axial spool hole and the rod are slip fits.

12. The probe assembly of claim 1 further comprising a guide disposed in the passageway and having a hole therethrough for guiding the rod.

13. The probe assembly of claim 12 wherein the guide is fitted with resilient seals around the rod and the passageway.

14. The probe assembly of claim 1 wherein the second end of the rod comprises a spring loaded pin adapted to contact a corresponding pin in the transmitter connector body.

15. The probe assembly of claim 14 where the spring loaded pin has a tapered self-aligning surface mateable with a corresponding tapered surface on the pin in the transmitter connector body.

16. A process seal assembly adapted for installation to a process vessel opening and adapted for connection to a probe connector, comprising:
    a housing adapted for sealingly mounting to the process vessel opening and for releasably mounting to a transmitter housing, the housing having a passageway from inside to outside the process vessel;
    a rod through the passageway having a first end coupled to the probe connector and a second end adapted to couple with a transmitter connector body;
    a rigid, electrically insulating spool fastened in the passageway, with an outer spool surface fitting tightly to a wall of the passageway and an axial hole fitting tightly to the rod.

17. The process seal assembly of claim 16 wherein the probe connector can be disconnected from the rod without disturbing the fit of the spool.

18. The process seal assembly of claim 16 further comprising resilient seals disposed between the spool and the passageway wall, and between the spool and the rod.

19. The process seal assembly of claim 18 wherein the probe connector can be disconnected from the rod without disturbing the resilient seals.

20. The process seal assembly of claim 16 further comprising a locking ring, and wherein the passageway wall has a narrowed region and a threaded region, and the spool is fastened in the housing between the narrowed region and the locking ring threaded into the threaded region.

21. The process seal assembly of claim 20 wherein the spool is isolated from the locking ring by a slip ring of deformable material.

22. The process seal assembly of claim 21 and further comprising at least one spring washer compressed between the locking ring and the slip ring.

23. The process seal assembly of claim 20 wherein the spool is isolated from the narrowed region by an isolator shield of deformable material.

24. The process seal assembly of claim 20 wherein the locking ring also fastens the rod.

25. The process seal assembly of claim 16 wherein the spool is ceramic.

26. The process seal assembly of claim 16 wherein the tight fit between the spool outer surface and the passageway wall and between the axial spool hole and the rod are flame quenching.

27. The process seal assembly of claim 16 further comprising a guide disposed in the passageway and having a hole therethrough for guiding the rod.

28. The process seal assembly of claim 27 wherein the guide is fitted with resilient seals around the rod and the passageway.

29. The process seal assembly of claim 16 wherein the second end of the rod comprises a spring loaded pin adapted to contact a corresponding pin in the transmitter connector body.

30. The process seal assembly of claim 29 wherein the spring loaded pin has a tapered self-aligning surface mateable with a corresponding tapered surface on the pin in the transmitter connector body.

* * * * *

UNITED STATES PATENT AND TRADEMARK OFFICE
CERTIFICATE OF CORRECTION

PATENT NO.   : 6,148,681
DATED        : November 21, 2000
INVENTOR(S)  : Gravel et al.

It is certified that error appears in the above-identified patent and that said Letters Patent is hereby corrected as shown below:

Column 6, line 14, change "lease" to --least--.

Signed and Sealed this

Twenty-ninth Day of May, 2001

Attest:

NICHOLAS P. GODICI

*Attesting Officer*    Acting Director of the United States Patent and Trademark Office